3,075,873
PESTICIDAL COMPOSITIONS CONTAINING BIS (O,O-DIALKYL DITHIOPHOSPHORO-) ALKYL-ETHERS AND ALKYLSULFIDES
Sidney B. Richter, Chicago, Ill., assignor to Velsicol Chemical Corporation, Chicago, Ill., a corporation of Illinois
No Drawing. Filed Sept. 30, 1960, Ser. No. 59,482
14 Claims. (Cl. 167—22)

This invention relates to new chemical compositions of matter and is a continuation of my copending application Serial No. 797,582, now abandoned. More specifically, this invention relates to new chemical compounds of the general formula

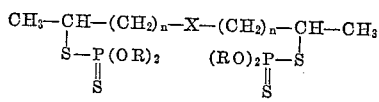

wherein X is selected from the group consisting of sulfur and oxygen, $n$ is a whole number from 0 to 1, and R is a saturated aliphatic hydrocarbon radical containing from 1 to 3 carbon atoms. These new compounds, useful as pesticides, are the 2:1 addition products of dialkyl phosphorodithioates $HS(S)P(OR)_2$ (R is as defined above) with divinyl ether, diallyl ether, divinyl sulfide, or diallyl sulfide.

The new compounds of this invention can be prepared readily by the addition of two molecular proportions of the dialkyl phosphorodithioate to each molecular proportion of the ether or sulfide employed. While these are satisfactory proportions of reactants, it is preferred to use a slight excess of the dialkyl phosphorodithioate. The reaction can be carried out satisfactorily in the absence of a solvent, but relatively inert solvents or diluents such as benzene, xylene, or toluene can be used if desired. It is also desirable to add a small amount of an oxidation inhibitor such as hydroquinone to the reaction mixture. The reaction temperature is not critical, but reaction temperatures in the range from about normal room temperature to about 75° C. (or the reflux temperature of the solvent or diluent, if one is used) are preferred. While the exact reaction time is dependent on a variety of factors, the addition reactions are generally complete within 24 hours. When the reaction is completed, the reaction mixture is cooled and taken up in a suitable solvent, if one has not already been used to run the reaction. The solution is then washed, first with a dilute aqueous solution of a base such as sodium carbonate to remove any excess acid reactant, and then with water. The solution is dried over an anhydrous drying agent such as sodium sulfate, and filtered. The solvent is then distilled off in vacuo to leave a residue of the desired addition product, which is often sufficiently pure for pesticidal use without further purification. If desired, however, it can be purified by fractional distillation or other techniques known to those skilled in the art.

Compounds of this invention in which X is sulfur are obtained by using either divinyl sulfide or diallyl sulfide as the reactant with the dialkyl phosphorodithioate, while compounds in which X is oxygen are obtained by using either divinyl ether or diallyl ether. When one of the divinyl compounds is used, $n$ in the compounds of this invention is 0; when one of the diallyl compounds is used, $n$ is 1.

The manner in which the new compounds of this invention can be prepared is illustrated in the following examples.

EXAMPLE 1
Preparation of the 2:1 Addition Product of O,O-Dimethyl Phosphorodithioate and Diallyl Sulfide A mixture of diallyl sulfide (23 g.; 0.2 mole) and 0.1 g. hydroquinone was placed in a 250-ml., round-bottomed flask fitted with a reflux condenser, mechanical stirrer, and internal thermometer. It was then treated in portions with O,O-dimethyl phosphorodithioate (80 g.; 0.5 mole), and the mixture was gradually heated to a temperature of 57° C. The conditions were maintained overnight, after which the temperature was raised to 70° C. for 7.5 hours. Work-up of the reaction mixture at this point indicated that the reaction was not yet complete. Hence an additional 20 g. of O,O-dimethyl phosphorodithioate was added, and the mixture was heated at 69° C. for 16.5 hours. The mixture was then cooled, dissolved in benzene, washed first with 200 ml. of 10% aqueous sodium carbonate solution and then with water, dried over anhydrous sodium sulfate, and filtered. The benzene was then distilled off in vacuo (final traces with a mechanical vacuum pump), and the residue was filtered through Filter-Cel diatomaceous silica filtering aid to give 58 g. of bis(2-O,O-dimethylphosphorodithio)-propyl sulfide, a viscous oil having an index of refraction (D line) at 20° C. of 1.5648.

Analysis for $C_{10}H_{24}O_4P_2S_5$: Theory: S, 37.24%; P, 14.41%. Found: S, 37.31%; P, 14.12%.

Other useful compounds within the scope of this invention can be prepared in the manner detailed above. Given in the following examples are the reactants required to prepare the indicated named compounds of this invention.

EXAMPLE 2
Divinyl ether+O,O-dimethyl phosphorodithioate=bis(1-O,O-dimethylphosphorodithio)ethyl ether.

EXAMPLE 3
Divinyl ether+O,O-di-n-propyl phosphorodithioate=bis(O,O-di-n-propylphosphorodithio)ethyl ether.

EXAMPLE 4
Divinyl ether+O,O-diethyl phosphorodithioate=bis(1-O,O-diethylphosphorodithio)ethyl ether.

EXAMPLE 5
Divinyl sulfide+O,O-diethyl phosphorodithioate=bis(1-O,O-diethylphosphorodithio)ethyl sulfide.

EXAMPLE 6
Divinyl sulfide+O,O-diisopropyl phosphorodithioate=bis(1-O,O-diisopropylphosphorodithio)ethyl sulfide.

EXAMPLE 7
Diallyl ether+O,O-dimethyl phosphorodithioate=bis(2-O,O-dimethylphosphorodithio)propyl ether.

EXAMPLE 8
Diallyl ether+O,O-diethyl phosphorodithioate=bis(2-O,O-diethylphosphorodithio)propyl ether.

EXAMPLE 9
Diallyl ether+O,O-di-n-propyl phosphorodithioate=bis(2-O,O-di-n-propylphosphorodithio)propyl ether.

EXAMPLE 10
Diallyl sulfide+O,O-diethyl phosphorodithioate=bis(2-O,O-diethylphosphorodithio)propyl sulfide.

EXAMPLE 11
Diallyl sulfide+O,O-di-n-propyl phosphorodithioate=bis(2-O,O-di-n-propylphosphorodithio)propyl sulfide.

EXAMPLE 12
Divinyl sulfide+O,O-dimethyl phosphorodithioate=bis(1-O,O-dimethylphosphorodithio)ethyl sulfide.

The new compounds of this invention are useful as pesticides, particularly as insecticides and miticides. This was illustrated, for example, in experiments carried out to demonstrate the residual toxicity of test compounds to houseflies. Two milliliters of an acetone solution of each chemical, prepared at various concentrations, were applied to a 125 mm. filter paper. After the solvent had volatilized, the houseflies were caged in hemispherical wire mesh cages over the treated filter paper for 24 hours and then observed for mortality. Three replicates were used for each level of application. In these experiments, the product of Example 1 used at a concentration of 1% gave 80.6% mortality of the houseflies, while there was no mortality in an untreated control.

Experiments were also carried out for the systemic control of the two-spotted spider mite (*Tetranychus bimaculatus*) by root absorption and translocation. The test compounds were dissolved in acetone and then dispersed in water at various concentrations of the actual chemical. Host plants, infested with mixed life stages of the mites, were uprooted, washed free of soil, and placed in glass jars containing 100 cc. of the dispersed test compound. Aluminum foil was then placed around the plant stem and jar to reduce possible escape of toxic vapors from the test dispersion. The test plants were maintained in the greenhouse for seven days and then observed for systemic miticidal effectiveness. Three replicates were used for each treatment. In these experiments, the product of Example 1 used at a concentration of 100 p.p.m. gave 100% mortality of the mites with no plant injury, while there was only 1.8% mortality in an untreated control.

Similar experiments were carried out for the systemic control of adult pea aphids (*Macrosiphum pisi*) by root absorption and translocation. The experiments were carried out in the same manner described above for the spider mite, except that the test plants were maintained in the greenhouse for 72 hours before observation of systemic aphicidal effectiveness. In these experiments, the product of Example 1 used at a concentration of only 50 p.p.m. gave 100% mortality of the aphids with no plant injury while there was only 7.1% mortality in an untreated control.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, cylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types.

Typical examples of such surface-active agents are sodium stearate, potassium laurate, morpholine oleate, sodium lauryl sulfate, sodium 2-ethylhexyl sulfate, sodium naphthalene sulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 13

*Preparation of an Emulsifiable Concentrate*

The following ingredients are blended thoroughly until a homogeneous liquid concentrate is obtained. This concentrate is mixed with water to give an aqueous dispersion containing the desired concentration of active compound for use as a spray.

Bis(2-O,O-dimethylphosphorodithio)propyl sulfide__ 25
Sodium lauryl sulfate_____ 2
Sodium lignin sulfonate_____ 3
Kerosene _____ 70

EXAMPLE 14

*Preparation of a Wettable Powder*

The following components are mixed intimately in conventional mixing or blending equipment and are then ground to a powder having an average particle size of less than about 50 microns. The finished powder is dispersed in water to give the desired concentration of active compound.

Bis(2-O,O-diethylphosphorodithio)propyl sulfide_ 75.00
Fuller's earth_____ 22.75
Sodium lauryl sulfate_____ 2.00
Methyl cellulose_____ .25

EXAMPLE 15

*Preparation of an Oil-Dispersible Powder*

The following components are blended and ground as described in the previous example to give a powder which can be dispersed in oil to form a spray containing the desired concentration of active compound.

Bis(2-O,O-dimethylphosphorodithio)propyl ether___ 70
Condensation product of diamylphenol with ethylene oxide_____ 4
Fuller's earth_____ 26

EXAMPLE 16

*Preparation of a Dust*

The following ingredients are mixed thoroughly and then ground to an average particle size of less than about 50 microns to give a dust suitable for application with conventional dusting equipment.

Bis(1-O,O-dimethylphosphorodithio)ethyl sulfide___ 20
Talc _____ 80

EXAMPLE 17

*Preparation of a Granular Formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

Bis(1-O,O-dimethylphosphorodithio)ethyl ether_____ 10
Fuller's earth_____ 66
Dextrin _____ 20
Sodium lignin sulfonate_____ 3
Kerosene _____ 1

I claim:

1. A compound of the formula

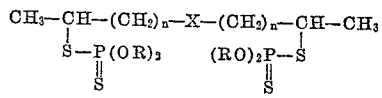

wherein X is selected from the group consisting of sulfur and oxygen, *n* is a whole number from 0 to 1, and R is a saturated aliphatic hydrocarbon radical containing from 1 to 3 carbon atoms.

2. A compound as described in claim 1, wherein X is sulfur.
3. A compound as described in claim 1, wherein X is oxygen.
4. Bis(2-O,O-dimethylphosphorodithio) propyl sulfide.
5. Bis(2-O,O-diethylphosphorodithio)propyl sulfide.
6. Bis(2-O,O-dimethylphosphorodithio)propyl ether.
7. Bis(1-O,O-dimethylphosphorodithio)ethyl sulfide.
8. Bis(1-O,O-dimethylphosphorodithio)ethyl ether.

9. An insecticidal and miticidal composition comprising an inert carrier and a toxic amount of a compound of claim 1.

10. A method of destroying undesirable insects and mites which comprises contacting these pests with an insecticidal and miticidal composition comprising an inert carrier and as the essential active ingredient, in a quantity which is toxic to said pests, a compound of claim 1.

11. A process for the preparation of a compound as described in claim 1 which comprises reacting at least two molecular proportions of a compound of the general formula HS(S)P(OR)$_2$, wherein R is a saturated aliphatic hydrocarbon radical containing from 1 to 3 carbon atoms, with one molecular proportion of a compound selected from the group consisting of divinyl ether, diallyl ether, divinyl sulfide, and diallyl sulfide.

12. A process as described in claim 11, wherein the reaction is carried out in the presence of a relatively inert solvent and at a temperature which is the reflux temperature of said solvent.

13. A process which comprises reacting at least two molecular proportions of O,O-dimethyl phosphorodithioate with one molecular proportion of diallyl sulfide.

14. A process which comprises reacting at least two molecular proportions of O,O-dimethyl phosphorodithioate with one molecular proportion of diallyl sulfide at a temperature of from about 57° to about 70° C., dissolving the reaction mixture in a relatively inert solvent, and removing therefrom the compound bis(2-O,O-dimethylphosphorodithio)propyl sulfide.

References Cited in the file of this patent

UNITED STATES PATENTS

| 2,596,076 | Hook et al. | May 6, 1952 |
| 2,884,353 | Christman | Apr. 28, 1959 |
| 2,884,354 | Christman | Apr. 28, 1959 |
| 2,885,430 | Scherer et al. | May 5, 1959 |

FOREIGN PATENTS

| 515,666 | Canada | Aug. 16, 1955 |